United States Patent [19]
Shirako et al.

[11] Patent Number: 4,722,016
[45] Date of Patent: Jan. 26, 1988

[54] TAPE CASSETTE FOR CLEANING USE

[75] Inventors: Hideo Shirako, Tokyo; Kazuhide Ishikawa, Chofu, both of Japan

[73] Assignee: Olympus Optical Co., Ltd., Japan

[21] Appl. No.: 649,730

[22] Filed: Sep. 12, 1984

[30] Foreign Application Priority Data

Sep. 19, 1983 [JP] Japan .................... 58-145440[U]
Jun. 18, 1984 [JP] Japan .................... 59-091039[U]

[51] Int. Cl.$^4$ .............................................. G11B 5/41
[52] U.S. Cl. .................................... 360/128; 360/132; 15/DIG. 12
[58] Field of Search ................ 360/128, 137, 132; 15/100, 210 R, DIG. 12, DIG. 13; 134/9

[56] References Cited

U.S. PATENT DOCUMENTS

| | | | |
|---|---|---|---|
| 3,820,504 | 6/1974 | Dahl ........................... | 118/68 |
| 4,134,170 | 4/1978 | Boudreau .................... | 15/100 X |
| 4,165,526 | 8/1979 | Jones .......................... | 360/137 |
| 4,388,663 | 6/1983 | Becella ........................ | 360/128 |
| 4,408,241 | 10/1983 | Ogawa ........................ | 360/137 X |
| 4,470,089 | 9/1984 | Hutchins et al. ............ | 360/128 |
| 4,635,156 | 1/1987 | d'Alayer de Costenoir d'Arc ........................... | 360/132 |
| 4,674,000 | 6/1987 | Lee .............................. | 360/128 |

FOREIGN PATENT DOCUMENTS

| | | | |
|---|---|---|---|
| 1825335 | 4/1960 | Fed. Rep. of Germany . | |
| 0114324 | 7/1983 | Japan .......................... | 360/128 |
| 58/109835 | 7/1983 | Japan . | |

Primary Examiner—Stuart N. Hecker
Assistant Examiner—David J. Severin
Attorney, Agent, or Firm—Ostrolenk, Faber, Gerb & Soffen

[57] ABSTRACT

A tape cassette for cleaning use supplies a cleaning liquid from a cleaning liquid supply to the opposite sides of a cleaning tape having a low friction factor and simultaneously achieves the reliable cleaning of a tape running passage and the smooth running of the cleaning tape, when a magnetic head of a tape recorder is inserted from an opening of a cassette housing, by pressing the cleaning tape against the magnetic head through a pad.

In addition, the tape cassette is constructed such that a surface of a liquid retaining member provided in the cleaning liquid supply is changeable which surface is in contact with the cleaning tape, so that the good and stable cleaning effect can be obtained over a long period of time.

23 Claims, 15 Drawing Figures

F I G. 3
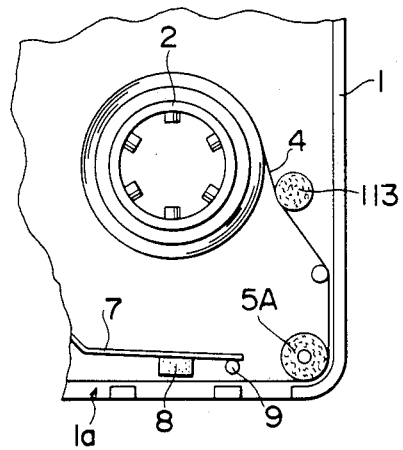
F I G. 4
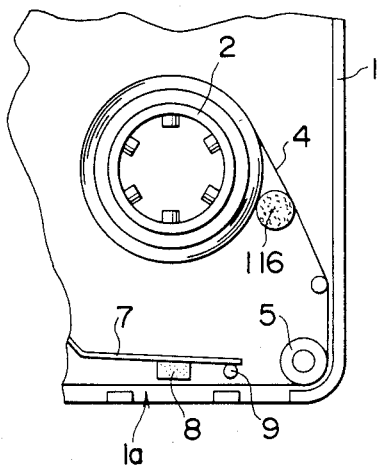

TAPE CASSETTE FOR CLEANING USE

BACKGROUND OF THE INVENTION

The present invention relates to a tape cassette for cleaning use, and more particularly, to a tape cassette for removing dirt on the tape running passage including a magnetic head, a pinch roller and the like of a tape recorder.

There is a likelihood that the long use of a tape recorder will result in dirt adhering to a magnetic head, a pinch roller, a capstan shaft and the like in the tape running passage, resulting in deterioration of performance in record and playback operations or in instability in the tape running.

For this reason, a tape cassette as disclosed in Japanese Laid Open Utility Model Publication Sho 58/1983-109825 has been proposed as a tape cassette for cleaning the tape running passage of a tape recorder. This tape cassette permits a cleaning tape to slidingly bear against a liquid retaining member from which a cleaning liquid is supplied to the cleaning tape and to thereby clean the tape running passage with the cleaning tape soaked with the cleaning liquid.

However, since only the tape tension is provided to bias the tape against the magnetic head, it is difficult to obtain sufficient pressure to ensure that the cleaning effect will not fall short of expectations.

One possible solution to this problem is to provide a pad against the magnetic head so as to bring the cleaning tape into contact with the magnetic head with a given pressure. However, with this arrangement, the friction factor between a fabric tape soaked with the cleaning liquid and the pad increases remarkably, which necessitates a strong force to run the cleaning tape and imposes a heavy load on a tape drive system of the tape recorder, resulting in a possibility of causing problems.

In addition, the repeated use of the conventional cleaning tape cassette wherein the tape is repeatedly rewound, results in dirt readhering to the surface of a liquid retaining member containing a cleaning liquid which surface is in sliding contact with the tape. As a result, when the number of uses of a tape recorder increases and contamination of the contact surface of the liquid retaining member exceeds a given level, the cleaning tape is recontaminated, resulting not only in reduction of the cleaning effect but in additional contamination of a tape running passage of the tape recorder. Furthermore, the conventional cleaning tape cassette is disadvantageous in that it is impossible to clean the capstan shaft of the tape recorder since the cleaning liquid is applied to only one surface of the cleaning tape.

SUMMARY OF THE INVENTION

It is an object of the present invention to provide a tape cassette for cleaning use which is capable of reliably cleaning a tape running passage including a magnetic head, a pinch roller, a capstan shaft and the like of a tape recorder and which permits a smooth running of a cleaning tape.

It is another object of the present invention to provide a tape cassette for cleaning use which permits the stable and good cleaning effect over a long period of time.

In a tape cassette for cleaning use according to the present invention, a cleaning tape having a low friction factor is wound on a pair of tape hubs within a cassette housing and is guided along an opening including a magnetic head insertion port of the housing while a cleaning liquid is applied to opposite sides of the cleaning tape by a cleaning liquid supply means. When a magnetic head is inserted into the port, a pressure is exerted on the cleaning tape through a pad located at the opening by a pad spring.

In addition, the tape cassette for cleaning use according to the present invention is adapted to properly change a surface of a liquid retaining member in contact with the cleaning tape, to which member a cleaning liquid is supplied.

According to the present invention, a magnetic head, a pinch roller, a capstan shaft and the like of a tape recorder can be reliably cleaned, the smooth running of the cleaning tape can be achieved, and the cause of failure in a tape drive system of the tape recorder can be eliminated.

Furthermore, according to the present invention, since the entire peripheral surface of the liquid retaining member can be used as a surface in contact with the cleaning tape, it is possible to simply change the tape contact surface of the liquid retaining member to a fresh contact surface thereof in accordance with the degree of contamination and to thereby obtain the good and stable cleaning effect over a long period of time.

In accordance with the presently preferred embodiment, applicants' tape cassette for cleaning use comprises:

a housing having an opening formed on one side thereof;

supply and winding tape hubs which are rotatably disposed within said housing;

a cleaning tape having first and second opposed surfaces, said tape being coupled to each of said tape hubs so as to be wound on said tape hubs;

guide means for guiding said tape from said supply tape hub along said opening and then to the said winding tape hub; and cleaning liquid supply means for applying a cleaning liquid to both said surfaces of said cleaning tape whereby when the cleaning tape is placed in a tape recorder, cleaning liquid on one side surface of the cleaning tape cleans a magnetic head and pinch roller of the tape recorder and cleaning liquid on the opposite said surface of said cleaning tape cleans a capstan shaft of the tape recorder.

BRIEF DESCRIPTION OF THE DRAWINGS

FIG. 3 is a plan view of the essential parts of a tape cassette for cleaning use according to another embodiment of the present invention;

FIG. 4 is a plan view of essential parts of a tape cassette for cleaning use according to a further embodiment of the present invention;

DESCRIPTION OF PREFERRED EMBODIMENTS

Figure 1:
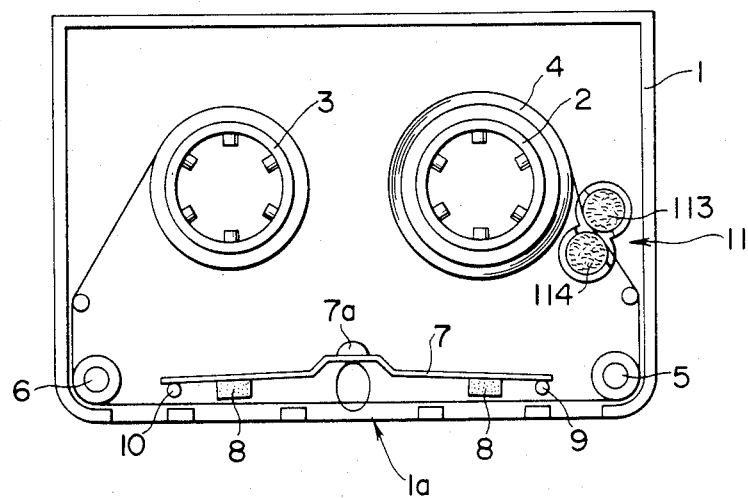
FIG. 1 is a plan view of a tape cassette for cleaning use according to one embodiment of the present invention, its upper cassette half being broken away.

Referring now to FIG. 1, a cassette housing 1 is composed of the upper and lower cassette halves, within which supply and winding tape hubs 2, 3 are rotatably disposed. A cleaning tape 4 is formed of material having a low friction factor, for example, a polyester film, opposite ends of which are fixed to the tape hubs 2, 3, respectively. The cleaning tape 4 is wound on the tape hub 2 and/or the tape hub 3 and is extended through guide rollers 5, 6 along an opening 1a including insertion ports for a magnetic head and a pinch roller in the housing 1. Accordingly, the cleaning tape 4 runs along the opening 1a during the rotation of the tape hub 2 or 3 in its winding direction.

A pad spring 7 formed of a leaf spring member is centrally secured to a support 7a in the rear of the tape 4 which is extended along the opening 1a. The pad spring 7 has a pair of pads 8, 8 which are fixed thereto near opposite ends of the front of spring 7 and the spring 7 are normally in abutment with pins 9, 10 at the opposite ends under its self resilience. When a magnetic head of a tape recorder is inserted through the opening 1a into the tape cassette, the pad spring 7 permits the tape 4 to be pressed against the magnetic head plane through the pad 8 under the self resilience of the pad spring. The pad 8 is formed, for example, by attaching a nonwoven fabric on a urethane member.

Figures 2A, 2B:
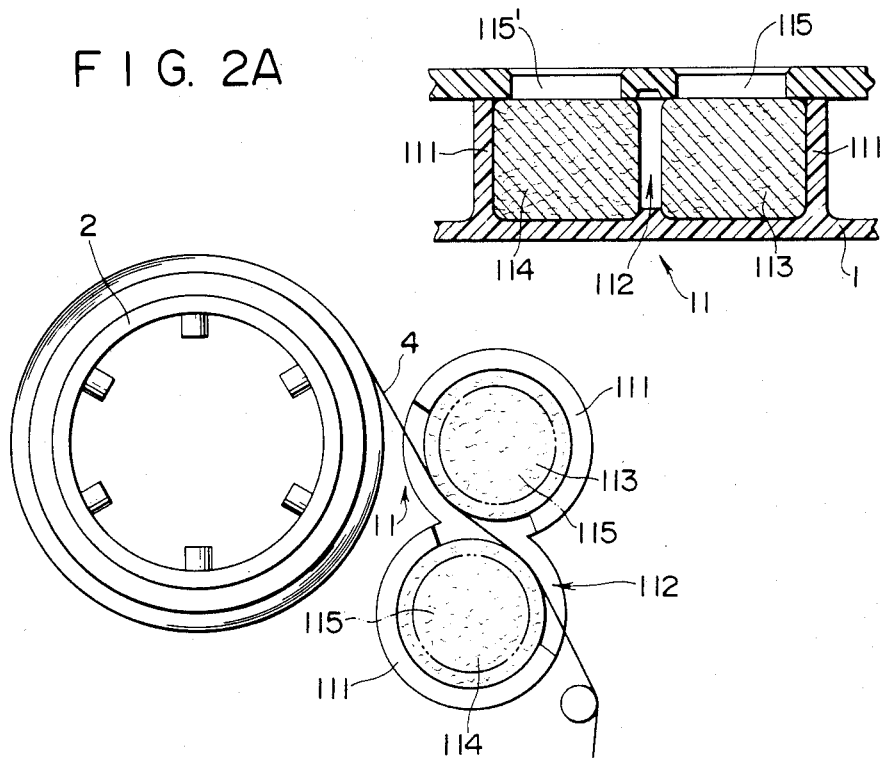
FIGS. 2A and 2B are enlarged plan and section views of the essential parts of the tape cassette shown in FIG. 1, respectively.

A cleaning liquid supply 11 is provided adjacent the supply tape hub 2 within the cassette housing 1. The cleaning liquid supply 11, as shown on a magnified scale in FIG. 2A, has a peripheral wall 111 in the form of the letter "8" in section and a slit 112 for the tape running path is formed at the center of the wall 111. A pair of liquid retaining members such as short tube-shaped liquid retaining felt member 113, 114 are housed in opposing relationship with each other within the wall 111. A cleaning liquid is absorbed by and retained in the felt members 113, 114 and is applied to the opposite sides of the tape 4 by permitting the tape 4 to run between the felt members 113, 114 with the felt member 113 in contact with the front surface of the tape 4 and with the felt member 114 in contact with the rear surface of the tape 4. The cleaning liquid supply 11, as shown in FIG. 2B, opens to the exterior through cleaning liquid inlet ports 115, 115 which are provided on the upper cassette half and externally supplies a cleaning liquid through the inlet ports 115, 115 to the felt members 113, 114.

In operation, in order to clean the tape running passage of a tape recorder, the tape cassette of the present invention is mounted in the cassette mounting housing of the tape recorder. Then, a cleaning liquid is poured through the inlet ports 115, 115 to fully soak the felt members 113, 114 with the cleaning liquid.

Subsequently, the tape recorder is operated by setting it in the playback or record mode. Then, the winding tape hub 3 is rotated in the winding direction and the cleaning tape 4 is drawn out successively from the supply tape hub 2. The drawn tape 4 is first brought into slidingly contact with the felt members 113, 114 in the cleaning liquid supply 11 and the cleaning liquid is applied to the opposite surfaces of the tape 4. Next, the tape 4 with the cleaning liquid applied runs through the guide roller 5 along the opening 1a to clean the magnetic head, pinch roller and capstan shaft of the tape recorder.

Since the tape 4 is brought into contact with the magnetic head plane with a provided pressure which is given by the pads 8 with the biasing force of the pad spring 7 against the magnetic head, it is possible to reliably clean the magnetic head plane. At this time, since the tape 4 is formed of a polyester film, for example, having a low friction factor, the friction between the tape 4 and the pad 8 can be minimized and the smooth tape running can be achieved. As a result, it is possible to prevent the tape drive system of the tape recorder from being unduly loaded and to eliminate the cause of failure. In addition, since the cleaning liquid is applied on the opposite sides of the tape 4, the pinch roller and the capstan shaft can be reliably and simultaneously cleaned, thereby preventing unstable running of the tape 4 due to contamination. Furthermore, deterioration of the tape properties results from the fact that dirt on the capstan shaft adheres, when a normal cassette tape is in use, to the back of the normal cassette tape and is then moved to the front side thereof when caught in the hub. Such inconvenience can also be eliminated.

It is a matter of course that the tape 4 after the cleaning operation is successively wound on the winding tape hub 3 through the guide roller 6.

It is to be understood that the present invention is not limited only to the foregoing embodiment but modification and variation of the invention are possible without departing from the spirit thereof. By way of example, the liquid retaining felt members 113, 114 which are disposed in the cleaning liquid supply 11 may be rotatable. With this structure, the running of the cleaning tape 4 can be made smoother. In addition, the cleaning liquid inlet ports 115, 115' may be formed by a plurality of small diameter holes. The cleaning liquid supply 11 may be formed by a guide roller 5A, as shown in FIG. 3, as a liquid retaining member which applies a cleaning liquid to the rear of the tape 4. In this case, the guide roller 5A is formed of a rotatable liquid retaining felt member. It will be understood that the guide roller 5A may be non-rotatable. Furthermore, the cleaning liquid supply 11 may be constructed with a single liquid retaining member, for example, a short tube-shaped felt member 116, as shown in FIG. 4. The felt member 116 is so arranged that part of the front surface of the tape 4 which is wound on the tape hub 2 contacts the left-hand side of felt member 116 (as viewed in FIG. 4) and part of the rear surface of the tape 4 which is removed from the tape hub 2 contacts the right-hand side of felt member 116. As a result, both the front and rear surfaces of the tape 4 are simultaneously brought into contact with the felt member 116, so that the cleaning liquid can be applied to the opposite sides of the tape 4 with the single felt member 116. At this time, the felt member 116 should be constructed so as to be movable in accordance with the diameter of wound tape roll on the tape hub 2.

Figure 5:
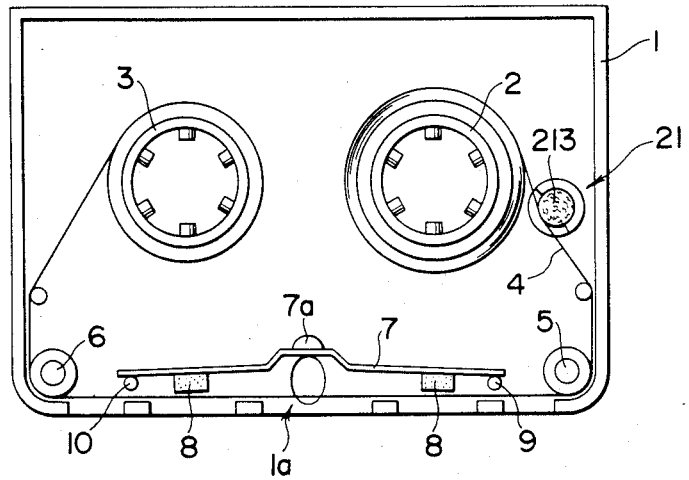
FIG. 5 is a plan view of a tape cassette for cleaning use according to a still further embodiment of the present invention, its upper cassette half being broken away.
Figure 6A:
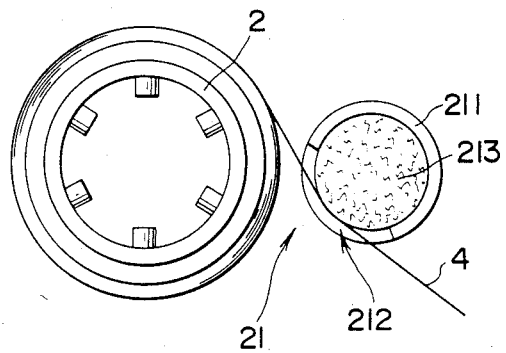
FIGS. 6A and 6B are enlarged plan and section views of the essential parts of the tape cassette shown in FIG. 5, respectively.

In FIG. 5, which illustrates a tape cassette for cleaning use according to another embodiment of the present invention, a cleaning liquid supply 21 is disposed adjacent the supply tape hub 2 so as to be in contact with the front side of the cleaning tape 4. The cleaning liquid supply 21, as shown on a magnified scale in FIG. 6A, has a cylinder-shaped peripheral wall 211 which has a slit 212 provided at its side wall in opposing relationship with the tape 4. A liquid retaining felt member 213 similar to the felt members 113, 114 is housed within the wall 211.

Figure 6B:
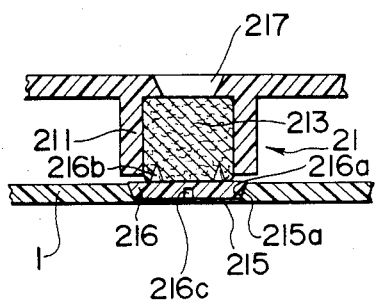
Figure 7A:
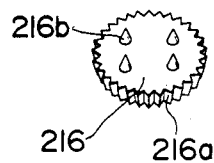
FIGS. 7A and 7B are perspectives viewed from the obliquely upper and lower directions of a retaining member adapted to be used in the tape cassette shown in FIG. 5, respectively.
Figure 7B:
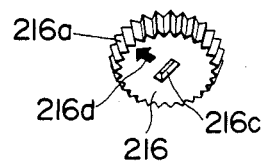
Figure 8:
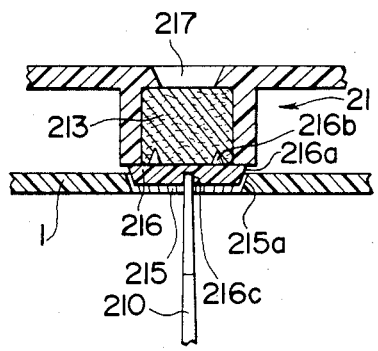
FIG. 8 is a diagram illustrating one method of changing a surface of a liquid retaining member in contact with a cleaning tape in the tape cassette shown in FIG. 5.

The cleaning liquid supply 21 is provided with an opening 215, as shown in FIG. 6B, which tapers down from the inner side of the housing 1 to the outer side thereof on a wall of one of the cassette halves which wall faces the felt member 213. A train of teeth 215a is provided on the tapered inner peripheral surface of the opening 215. A retaining member 216 to which the felt member 213 is fixed is fitted into the opening 215 from the inner side of the housing 1. The retaining member 216, as shown in FIGS. 7A and 7B, is formed of a disc whose outer peripheral surface tapers down from the inner side of the housing 1 to the outer side thereof and forms a train of teeth 216a for engaging the teeth train 215a of the housing 1. A plurality of pointed pins 216b are fixed to the retaining member 216 on its surface located on the inner side of the housing 1. The felt 213 is secured to the retaining member 216 by thrusting the pins 216b into the lower side of the felt member 213. The felt member 213 is so selected that its thickness is somewhat larger than the height of the space in the housing 1. The teeth train 216a of the retaining member 216 securely engages the teeth train 215a of the opening 215 by the reaction force due to the elastic compression of the felt member 213, so that the retaining member 216 is temporarily fixed to the housing 1. In addition, a groove 216c is formed on the outer surface of the retaining member 216 located on the outer side of the housing 1. The groove 216c serves enable the user to externally turn the retaining member 216. Specifically, as shown in FIG. 8, the felt 213 is compressed by inserting the tip of a screw driver 210 into the groove 216c and pushing the retaining member 216 in the vertical direction so that the engagement between the teeth trains 215a, 216a is released and then the retaining member 216 and the felt member 213 are turned by rotating the screw driver 210. Furthermore, an index 216d is provided on the retaining member surface having the groove 216c and a scale (not shown) is provided along the peripheral edge of the opening 215 on the other side of the housing 1 so that the rotational amount of the retaining member 216 can be accurately read. It will be understood that in place of the index 216d, the groove 216c itself may also be utilized as an index.

Returning to the FIG. 6B, a cleaning liquid inlet port 217 is provided on the wall of another cassette half which is opposite the cassette half having the opening 215 in such a manner that the inlet port 217 faces the felt member 213. It will be understood that the inlet port 217 is so designed that its inner diameter is smaller than the diameter of the felt member 213 in order to prevent the felt member 213 from coming out.

Parts not referred to in the foregoing are formed in a manner similar to the tape cassette of the embodiment shown in FIG. 1. Therefore, corresponding parts are designated by common reference numerals and their description will not be reiterated (the same can be applied to the following embodiments).

In operation, when the tape cassette of the above stated embodiment is mounted on a tape recorder and is operated in the playback or record mode, the cleaning tape 4 is successively drawn out from the supply tape hub 2 and a cleaning liquid is applied to the surface of the tape 4 in slidingly contact with the felt member 213 in the cleaning liquid supply 21. Subsequently, the tape 4 to which the cleaning liquid is applied runs through the guide roller 5 along the opening 1a to clean a magnetic head, a pinch roller and the like of the tape recorder.

In the tape cassette described above, the cleaning tape 4 is rewound on the supply tape hub 2 whenever the cleaning operation of the tape running passage is completed, to use repeatedly. After repetition of the cleaning operation, when dirt on the tape 4 adheres to the contact surface of the felt 213 and contamination thereon reaches an undesirable level, the retaining member 216 is pushed in the vertical direction, as shown in FIG. 8, by inserting the tip of screw driver 210 into the groove 216c, so that the felt member 213 is compressed to release the engagement between the teeth trains 215a, 216a. Under this condition, when the screw driver 210 is turned the felt member 213 turns together with the retaining member 216 so that the felt surface in contact with the tape is changed to a fresh contact surface of the felt member 213. When the screw driver 210 is removed, the retaining member 216 is again fitted into the opening 215 by the reaction force of the felt member 213 is fixed in place.

Thus, the contact surface changing operation is repeated when the contamination of the felt member 213 at its surface in contact with the tape reaches an undesireable level and thereby the contact surface of the felt member 213 is always changed to a fresh contact surface, resulting in the stable and good cleaning effect over a long period of time. At this time, when the rotational amount of the retaining member 216 is determined by observing the scale provided on the peripheral edge of the opening 215, it is possible to effectively utilize the entire peripheral surface of the felt member 213.

In the above stated tape cassette, in which the pointed pins 216b are provided on the retaining member 216 to hold the felt member 213 by the pins 216b, the felt member 213 may be fixed to the retaining member 216 by adhesives. While the foregoing structure is such that the teeth train 216a formed on the outer peripheral surface of the retaining member 216 engages the teeth train 215a formed on the inner peripheral surface of the opening 215, the retaining member 216 may be formed in a regular polygon and the opening 215 of the housing 1 corresponding thereto may also be formed in the regular polygon so that the retaining member 216 can be turned by a given angle under the engagement of both regular polygon members.

Figure 9:
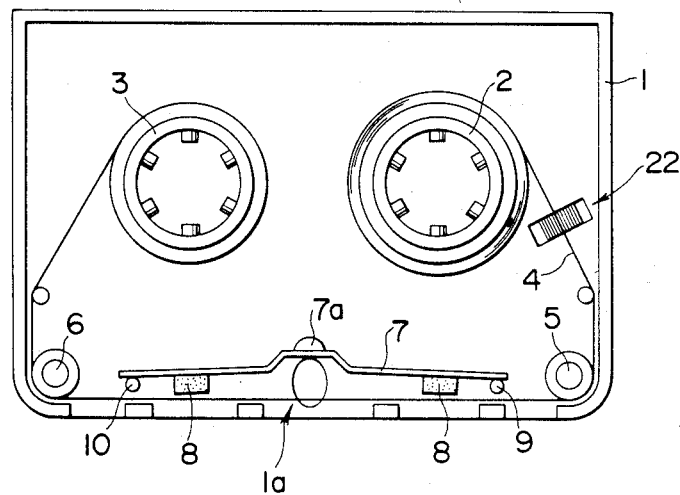
FIG. 9 is a plan view of a tape cassette for cleaning use according to yet another embodiment of the present invention.
Figure 10:
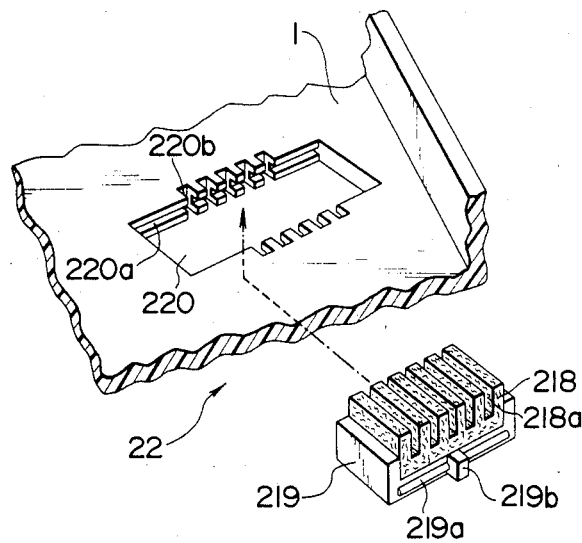
FIG. 10 is an exploded perspective view of the essential parts of the tape cassette shown in FIG. 9.

In FIG. 9, which illustrates a further embodiment of the present invention, a cleaning liquid supply 22, as shown in FIG. 10 is formed in a comblike structure in which a liquid retaining member, for example, a felt member 218, includes a plurality of grooves 218a through which the cleaning tape passes. In addition, a protrusion 219a for fixing the member 219 in the housing 1 is provided along the side plane of a rectangular form retaining member 219 for the felt member 218 and a projection 219b for positioning the member 219 relative to opening 220 is provided at the center of the side plane of the retaining member 219. A groove 220a is provided in a rectangular opening 220 of the housing 1 and cooperates with protrusion 219a to position the retaining member in the plane of the bottom wall of the housing 1. Grooves 220b corresponding to the projection 219b are provided at the same spacing and in the same number as those of the grooves 218a and cooperates with the projection 219b to position the retaining member 219 laterally within the opening 220. The protrusion of the felt retaining member 219 is fitted into the groove 220a of the opening 220 and the projection 219b is fitted into one of the grooves 220b so that the felt member 218 is held within the housing 1 and the cleaning tape is permitted to run through one of the grooves 218a with the tape in slidingly contact with the latter.

The operation of the tape cassette according to the above embodiment is substantially similar to that of tape cassettes according to the previously mentioned embodiments. After the cleaning operation is repeated by rewinding the cleaning tape 4 and when the groove 218a in contact with the tape is contaminated to an undesirable level, the tape passing groove 218a of the felt member 218 through which the tape 4 passes is changed to an unused one by removing the retaining member 219 from the opening 220, shifting the retaining member 219 along the opening 220 and then refitting the member 219 into the adjacent groove 220b. Such operation is repeated to change to an unused groove 218a whenever the contamination of one of the grooves 218a exceeds a certain level, so that a good and stable cleaning can be achieved over a long period of time. In this case, when an index is provided on the retaining member 219 and a scale corresponding to the pitch of the grooves 220b is provided along the side edge of the opening 220, these are the guide for shifting the felt member 218 along the opening 220, thus facilitating the operation. It will be understood that in this case also the projection 219b may be used in place of the index.

Figure 11:
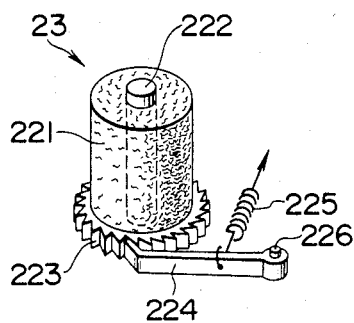
FIGS. 11 and 12 are enlarged perspective and section views of the essential parts of a tape cassette for cleaning use according to a still yet further embodiment of the present invention.
Figure 12:
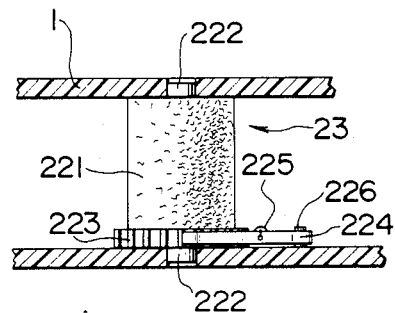

In FIGS. 11 and 12, which illustrate a further embodiment of the present invention, the cleaning liquid supply 23 is formed of a felt member 221 in a cylindrical form, that is, the liquid retaining member, and a rotary shaft 222 passing through the hollow portion of the felt 221 is rotatably supported on the upper and lower planes of the housing 1. A ratchet 223 is provided on one end of the shaft 222. A pawl 224 is rotatably pivoted at its base on a pin 226 and is rotatably biased in one direction by a spring 225. The pawl 224 engages the ratchet 223 to permit the latter to rotate in one direction only. In this case, the ratchet 223 prevents the felt member 221 from rotating in the running direction of the cleaning tape 4 during the cleaning operation and permits the felt 221 to rotate in the opposite direction of the tape 4 during the rewinding thereof. With this arrangement, the contaminated surface of the felt member 221 in contact with the tape can be changed to a fresh surface of the felt member for the next cleaning operation by turning of the felt member 221 during the tape rewinding operation so that the entire peripheral surface of the felt member 221 can be uniformly used, resulting in the good cleaning effect over a long period of time. It will be understood that the felt 221 may be rotated only by the manual operation.

What is claimed is:

1. A tape cassette for cleaning use comprising:
   a housing having an opening formed on one side thereof;
   supply and winding tape hubs which are rotatably disposed within said housing;
   a cleaning tape having first and second opposed surfaces, said tape being coupled to each of said tape hubs so as to be wound on said tape hubs;
   guide means for guiding said tape from said supply tape hub along said opening and then to the said winding tape hub; and
   cleaning liquid supply means for applying a cleaning liquid to both said surfaces of said cleaning tape, said cleaning liquid supply means having a pair of liquid retaining members which are in contact with said first and second surfaces of said cleaning tape, respectively, whereby when the cleaning tape is placed in a tape recorder, cleaning liquid on one side surface of the cleaning tape cleans a magnetic head and pinch roller of the tape recorder and cleaning liquid on the opposite said surface of said cleaning tape cleans a capstan shaft of the tape recorder.

2. A tape cassette according to claim 1, in which said pair of liquid retaining members are disposed adjacent said supply tape hub in opposing relationship with each other and with their outer surfaces immediately adjacent one another.

3. A tape cassette according to claim 1, in which said pair of liquid retaining members comprise a first liquid retaining member disposed adjacent said supply tape hub and in contact with said first surface of the cleaning tape a second liquid retaining member which is a guide roller capable of retaining a cleaning liquid and which is in contact with said second surface of said cleaning tape, said guide roller forming part of said guide means.

4. A tape cassette according to claim 1, in which said cleaning tape is formed of material having coefficient of a low friction and in which a pad spring is further provided for biasing said cleaning tape in the direction of said opening as said tape passes said opening.

5. A tape cassette according to claim 1, in which said cleaning liquid supply means is further provided with a cleaning liquid inlet port for externally supplying a cleaning liquid to said cleaning liquid supply means.

6. A tape cassette according to claim 1, in which said liquid retaining members are felt member.

7. A tape cassette according to claim 1, wherein said cleaning liquid supply means applies cleaning liquid to one of said surfaces of said cleaning tape at a first location along the path of movement of said cleaning tape as said cleaning tape is wound between said supply and winding tape heads and applies cleaning liquid to the other of said surfaces of said cleaning tape at a second location, upstream of said first location, along said path of movement of said cleaning tape whereby the drag that said liquid supply means applies to said tape is reduced.

8. A tape cassette according to claim 7, wherein said cleaning liquid supply means includes a curved surface across which said cleaning tape passes and from which cleaning fluid is applied to said cleaning tape.

9. A tape cassette according to claim 7, wherein one of said liquid retaining members contacts said first surface of said cleaning tape at said first location and the other of said liquid retaining members contacts said second surface of said cleaning tape at said second location.

10. A tape cassette according to claim 9, wherein said pair of liquid retaining members are so positioned that they cause said tape to move along an S-shaped path.

11. A tape cassette according to claim 10, wherein said pair of liquid retaining members include respective curved surfaces along which said cleaning tape passes and from which cleaning fluid is applied to said cleaning tape.

12. A tape cassette for cleaning use comprising;
a housing having an opening formed on one side thereof;
supply and winding tape hubs which are rotatably disposed within said housing;
a cleaning tape coupled to said supply and winding tape hubs so as to be wound on said tape hubs;
guide means for guiding said tape from said supply tape hub past said opening and then to the said winding tape hub;
cleaning liquid supply means disposed adjacent said supply tape hub and including a liquid retaining member for applying a cleaning liquid to said cleaning tape, said liquid retaining member having an outer surface only a portion of which is in contact with said tape at any given instant; and
means for enabling the portion of said outer surface of said liquid retaining member which is in contact with said cleaning tape to be changed by the user of said cassette.

13. A tape cassette according to claim 12, in which;
(A) said liquid retaining member is formed in a comb-like structure having a plurality of grooves through which said cleaning tape may pass;
(B) said enabling means comprises;
(1) a rectangular opening provided in said housing; and
(2) a holding member which is removably fitted into said rectangular opening in such a manner that the position of said holding member relative to said rectangular opening may be changed whereby the particular said groove through which said tape passes may also be changed.

14. A tape cassette according to claim 12, in which said enabling means comprises a ratchet fixed on one end of a rotary shaft which supports said liquid retaining member and a pawl which is biased so as to engage said ratchet, said liquid retaining member being locked when said cleaning tape is moved in a direction from said supply hub to said winding hub and is rotatable when said cleaning tape is moved in a direction from said winding hub to said supply hub.

15. A tape cassette according to claim 12, in which said cleaning tape is formed of material having a low friction factor and a pad spring is further provided so as to bias said cleaning tape in the direction of said opening when said tape is in the vicinity of said opening.

16. A tape cassette according to claim 12, in which said cleaning liquid supply means is further provided with a cleaning liquid inlet port for externally supplying a cleaning liquid to said cleaning liquid supply means.

17. A tape cassette according to claim 12, in which said liquid retaining member is a felt member.

18. A tape cassette according to claim 13, in which said liquid retaining member is formed in a comblike structure having a plurality of grooves through which said cleaning tape may pass and in which said enabling means comprises means for adjusting the position of said grooves relative to said tape so that the specific groove through which said tape passes may be changed.

19. A tape cassette according to claim 12, wherein said liquid supply means has a cylindrical outer surface, and wherein said enabling means permits said cleaning liquid supply means to be rotated about a central axis of said cylinder.

20. A tape cassette according to claim 12, in which said means for enabling comprises:
a circular opening provided on said housing and having an inner peripheral surface which tapers in diameter from an inner side of said housing to an outer side thereof; and
a holding member which is formed of a disc having its outer peripheral surface tapered down in diameter from said inner side of the housing to said outer side thereof and which is biased against said inner peripheral surface of said circular opening by a resilient force resulting from a compressive deformation of said liquid retaining member which is coupled to said holding member and is held in a compressive state between said holding member and said housing.

21. A tape cassette according to claim 20, in which mating teeth are formed on both the inner peripheral surface of said circular opening and the outer peripheral surface of said holding member so as to prevent said holding member from being rotated with respect to said circular opening when said inner and outer peripheral surfaces are in contact with one another.

22. A tape cassette according to claim 20, in which an index is provided on said retaining member so that the position of said liquid retaining member can be read externally.

23. A tape cassette for cleaning use comprising:
a housing having an opening formed on one side thereof;
supply and winding tape hubs which are rotatably disposed within said housing;
a cleaning tape having first and second opposed surfaces, said tape being coupled to each of said tape hubs so as to be wound on said tape hubs;
guide means for guiding said tape from said supply tape hub along said opening and then to the said winding tape hub; and
cleaning liquid supply means for applying a cleaning liquid to both said surfaces of said cleaning tape, said cleaning liquid supply means being a single liquid retaining member disposed to be in contact with both a portion of said first surface of said cleaning tape which is wound on said supply tape hub and a portion of said second surface of said cleaning tape which has been removed from said supply tape hub and which is located adjacent said supply tape hub.

* * * * *